US 7,058,680 B2

(12) United States Patent
Mito et al.

(10) Patent No.: US 7,058,680 B2
(45) Date of Patent: Jun. 6, 2006

(54) INFORMATION DISTRIBUTION METHOD AND SYSTEM

(75) Inventors: Tomoko Mito, Kawasaki (JP); Akira Ohkado, Yokohama (JP); Uemitsu Kageyama, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 09/973,395

(22) Filed: Oct. 9, 2001

(65) Prior Publication Data

US 2002/0049835 A1 Apr. 25, 2002

(30) Foreign Application Priority Data

Oct. 6, 2000 (JP) .............................. 2000-308244

(51) Int. Cl.
*G06F 15/16* (2006.01)
*G06F 15/173* (2006.01)
*G06F 17/30* (2006.01)

(52) U.S. Cl. ...................... 709/201; 709/224; 709/226; 726/27; 726/30

(58) Field of Classification Search ................ 709/201, 709/224, 226; 726/27, 30; 380/1
See application file for complete search history.

(56) References Cited

U.S. PATENT DOCUMENTS

| 5,584,022 | A * | 12/1996 | Kikuchi et al. ................. 707/9 |
| 6,128,663 | A * | 10/2000 | Thomas ........................ 709/228 |
| 6,141,666 | A * | 10/2000 | Tobin ........................... 715/513 |
| 6,370,575 | B1 * | 4/2002 | Dougherty et al. .......... 709/224 |
| 6,449,647 | B1 * | 9/2002 | Colby et al. ................. 709/226 |
| 6,564,217 | B1 * | 5/2003 | Bunney et al. ................ 707/10 |
| 6,665,659 | B1 * | 12/2003 | Logan ............................ 707/3 |
| 6,775,688 | B1 * | 8/2004 | Kakimoto .................... 709/203 |

FOREIGN PATENT DOCUMENTS

| JP | 09-154119 | 6/1997 |
| JP | 09-245049 | 9/1997 |
| JP | 9-281918 | 10/1997 |
| JP | 11-51666 | 2/1999 |
| JP | 11-110401 | 4/1999 |
| JP | 11-252003 | 9/1999 |
| JP | 11-345248 | 12/1999 |
| JP | 11-355854 | 12/1999 |
| JP | 2000-067067 | 3/2000 |

* cited by examiner

*Primary Examiner*—Ario Etienne
*Assistant Examiner*—El Hadji M. Sall
(74) *Attorney, Agent, or Firm*—Casey P. August

(57) ABSTRACT

One objective of this invention is to provide means for selecting, from among an enormous amount of data, truly necessary information, and for distributing such selected information while maintaining the secrecy of personal information. Information, such as public user information, that a user permits to be registered is stored in the server of an information provider, which refers to such information in order to filter information that is to be distributed and to generate information choices. The information choices are then transmitted to the user terminal and the user filters them and makes second choices by referring to secret user information stored in the user terminal. The user then requests from the server the main body of information for such second choices. Upon the receipt of the user's request, the server transmits the requested main body of information and the user terminal receives and displays the information.

10 Claims, 9 Drawing Sheets

FIG. 4

| USERID | FIELD | DISTRIBUTION TIME |
|---|---|---|
| 234 | MENU | AS REQUESTED |
| 235 | PHARMACEUTICAL | 10 O'CLOCK ON WEEKDAYS |
| 236 | HOUSING, NURSING | 11 O'CLOCK ON WEEKDAYS |

FIG. 5

| INFORMATION ID | ATTRIBUTE 1 | ATTRIBUTE 2 | ATTRIBUTE 3 | ATTRIBUTE 4 | ATTRIBUTE 5 |
|---|---|---|---|---|---|
| 001 | TYPE: MENU | MENU NAME: FIXED MEAL WITH GRILLED FISH | CALORIES: 572kcal | SALT CONTENT: 4.0g | NAME OF RESTAURANT: RESTAURANT "YASAIYA" |
| 002 | TYPE: MENU | MENU NAME: CHICKEN CURRY AND RICE | CALORIES: 604kcal | SALT CONTENT: 2.3g | NAME OF RESTAURANT: RESTAURANT "AKUBAL" |
| 003 | TYPE: MENU | MENU NAME: BOWL OF CUTLET AND RICE | CALORIES: 980kcal | SALT CONTENT: 3.7g | NAME OF RESTAURANT: RESTAURANT "WAKO" |
| 004 | TYPE: MENU | MENU NAME: CHINESE NOODLES | CALORIES: 590kcal | SALT CONTENT: 7.3g | NAME OF RESTAURANT: RESTAURANT "WAKO" |
| 005 | TYPE: MENU | MENU NAME: BUCKWHEAT NOODLE SERVED ON A BAMBOO PLATE | CALORIES: 550kcal | SALT CONTENT: 8.1g | NAME OF RESTAURANT: RESTAURANT "SOBA-AN" |
| 006 | TYPE: MENU | MENU NAME: FIXED MEAL WITH SWEET-AND-SOUR PORK | CALORIES: 1200kcal | SALT CONTENT: 5.3g | NAME OF RESTAURANT: RESTAURANT "HEI CHIN RO" |
| 007 | TYPE: MENU | MENU NAME: BEEFUN | CALORIES: 1050kcal | SALT CONTENT: 4.3g | NAME OF RESTAURANT: RESTAURANT "WAGAYA" |
| 008 | TYPE: MENU | MENU NAME: HAND-ROLLED SUSHI | CALORIES: 1080kcal | SALT CONTENT: 7.3g | NAME OF RESTAURANT: SUSHI RESTAURANT "MURASAKI" |

FIG. 6

| INFORMATION FIELD | HEALTH |
|---|---|
| INFORMATION TYPE | MENU |
| CHRONIC DISEASE | ANGINA PECTORIS |
| INTAKE LIMIT | YES |
| CALORY LIMIT | 1800kcal |
| SALT LIMIT | 10g |
| CURRENT CALORIE INTAKE | 1190kcal |
| CURRENT SALT INTAKE | 4.7g |
| CURRENT TIME | pm 6:30 |

FIG. 7

| USERID | INFORMATION ID |
|---|---|
| 234 | 001, 002 |

INFORMATION DISTRIBUTION METHOD AND SYSTEM

FIELD OF THE INVENTION

The present invention relates to an information distribution method and system, and in particular to a technique for effectively performing an operation to select information for distribution, while referring to information regarded as secret, such as personal information that is not to be distributed.

BACKGROUND OF THE INVENTION

As the application of Internet techniques has spread, so too has the provision and availability of information distribution services. According to common information distribution services, not only registrations of information for specifying users, such as the e-mail addresses of distribution destinations and the names or the categories of users, but also registrations covering desired information fields and distribution times are accepted. A distribution service provider selects information in accordance with registered preferences and distributes the information to users.

Ordinary users do not always desire to receive all the information that is available from a distribution service provider. Therefore, the general rule is for users to set conditions, such as desired fields, for the distribution of information, and that they receive only that information which matches the conditions they have established. If users do not make such selections, under present conditions an enormous amount of information will cross over to the user. This will not only contribute to an increase in communication traffic, but also, data that users truly require will be scattered through and hidden in a huge amount of irrelevant, unwanted information, and the effective distribution of information will be disrupted.

Thus, means for filtering the variety of information that is available for distribution has been proposed. For example, in Japanese Unexamined Publication No. Hei 11-51666 or No. 9-281918, means is disclosed for searching for information appropriate to the current location of a user, while referring to the current location information for a terminal though which an information distribution request was issued, and for distributing the information. Further, in Japanese Unexamined Publication No. Hei 11-252003, a method is disclosed for providing a personal information search service or an additional information service by referring to a history of visits made to a service area. In addition, in Japanese Unexamined Publication No. Hei 11-355854, a method is disclosed for permitting the collection of information desired by a terminal from among service data distributed by a base station.

In order to use the above methods to filter the information to be distributed, certain personal information is naturally required. Since a distribution server is in charge of filtering the information to be distributed, the personal information must be held by the server. That is, either intentionally or unintentionally, personal information must be disclosed to a distribution source in order for it to select, from among available data, that data in which a specific user should be interested, i.e., information that the user will find useful. When, for example, property information is to be distributed to a user who plans to purchase real estate, valid and relevant information can be distributed only so long as the annual income (purchasing capability) of the user is readily available. Further, when a person having a clinical treatment history desires to obtain information concerning a diet, the clinical history may be inferred by referring to the selected information. Further, to distribute detailed information in real time with very little delay, even without referring to the previous examples, it is evident that an even greater amount of detailed personal information will be required.

However, originally, personal information should be handled with care. Further, it is a given that personal information must not be disclosed without the permission of the users. It is also believed that many users abandon the idea of registering their personal data with a distribution source because they hesitate to disclose it. In addition, users are always apprehensive about the security that their personal information will be afforded, and that adequate measures will be taken to keep it secret. Therefore, this situation may be a factor in preventing the more effective use of information distribution systems.

As another application method, a server does not hold any personal information, or holds only minimum required personal information, and distributes it without performing any special screening of the material. However, when this method is employed, a greater load is imposed on a network and on computers used for information distribution due to an increase in communication traffic. In addition, information that has been requested and is truly required, may be mixed in with a large amount of other, extraneous information, which may prevent its ready distribution.

It is, therefore, one objective of this invention to provide means for distributing only truly necessary information, selected from among the huge amount of information that is available, while providing adequate security for personal information that must be kept secret. It is another objective of this invention to provide means for appropriately selecting necessary information, without increasing communication traffic and without disclosing personal information.

SUMMARY OF THE INVENTION

An overview of the present invention will now be presented. According to the information distribution method and system for this invention, user information (first information) that a user permits registration of is recorded in an information distribution server (first information processing apparatus). Then, by referring to the first information, the first information processing apparatus filters the information that is to be distributed, and generates a single first choice or multiple first choices. The first choice or choices are transmitted to a user's terminal (second information processing apparatus), and the user, by referring to the second information (personal information to be kept in secret) recorded in the user's terminal, selects a single second choice or multiple second choices. Thereafter, the user submits a request for relevant information for the second choice or choices to the information distribution server, who transmits the desired information upon receiving this request. Then, the user's terminal receives the information and displays it, so it is available for employment by the user.

According to the method and system of this invention, personal information that should be kept secret is retained by a user's terminal, and is not available at the information distribution server. Therefore, greater secrecy can be afforded personal information, and the system can be safely employed by a user. This will encourage many more users to employ the service, and more effective use of the information distribution system can be provided. Further, only attribute information is used for the first and the second choices. That is, during the process performed to filter the information, the attribute information, for which volume is small, rather than the main body of the information, for which volume is large, is exchanged by the information distribution server and the user's terminal. Later, after the information has been satisfactorily filtered, the main body of the information, for which the volume is large, is exchanged. As a result, the communication load and the operating load imposed on the information processing apparatuses can be reduced. It should be further noted that the user's access history can be included in the second information.

A preferred embodiment of the invention will now be described while referring to the accompanying drawings. It should be noted, however, that the present invention can be carried out by employing a variety of different modes, and is not limited to the following embodiment. The same reference numerals are employed throughout the embodiment to denote corresponding or identical components.

In the following embodiment, primarily, an explanation will be given for the method and the system. However, as will be obvious to one having ordinary skill in the art, the present invention can be implemented not only as a system, but also as a medium on which computer-executable program code is recorded. Therefore, the present invention can be provided as hardware, as software, or as a hardware and software combination. Example computer-readable media that can be used for recording program code are hard disks, CD-ROMs, optical storage devices and magnetic storage devices.

A computer system (information processing apparatus) that can be used for this embodiment comprises a central processing unit (CPU), a main memory (RAM (Random Access Memory)) and a nonvolatile storage device (ROM (Read Only Memory)), all of which are interconnected by a bus, to which a co-processor, an image accelerator, a cache memory and an input/output controller (I/O) are also connected. In addition, an external storage device, a data input device, a display device and a communication controller may also be connected to the bus, and general hardware resources with the computer system is equipped may also be included. A typical external storage device can be a hard disk drive, and can also include a semiconductor storage device, such as a magneto-optical storage device, an optical storage device or a flash memory. A read only storage device, such as a CD-ROM that can be used only for the reading of data, can also be included as an external storage device when the device is used only for reading data or a program. An input device, such as a keyboard, and a pointing device, such as a mouse, can also be provided as data input devices, as can a voice input device. While an example display device can be a CRT, a liquid crystal device or a plasma display device. The computer system in this embodiment includes an arbitrary computer type, such as a personal computer, a workstation or a main frame computer.

The computer system of this embodiment can be used as a single computer system, or it can be used to establish a network for multiple computer systems. In this case, the Internet, a LAN or a WAN can be used for communication among the computer systems. A communication line used for this connection may be either a private line or a public network line, and when multiple computer systems are employed to carry out the present invention, the program used by each computer system may be recorded in another computer system (e.g., a server computer). That is, a remote computer (e.g., another server computer or client computer) can perform distributed processing or can execute a part of the program used by the computer system. When an address is to be used to refer to a program stored in another computer system, a DNS, URL or IP address can be employed. The data explained in this embodiment may be distributed and recorded, and these recorded data can be accessed by specifying a location using a DNS, URL or IP address.

It should be noted that when remarks are made concerning the Internet, these remarks also apply to intranets and extranets. And that references to Internet access also refer to intranet and extranet accesses. The term "computer network" is used to describe both a network that can be accessed publicly and a network to which only private access is permitted.

BRIEF DESCRIPTION OF THE DRAWINGS

FIG. 4 is a diagram showing a registered public user information example.

FIG. 5 is a diagram showing example generated information choices.

FIG. 6 is a diagram showing example secret user information stored in the user terminal.

FIG. 7 is a diagram showing the list of information that is determined at step 37 to match a condition.

DESCRIPTION OF THE SYMBOLS IN THE DRAWINGS

Figure 1:
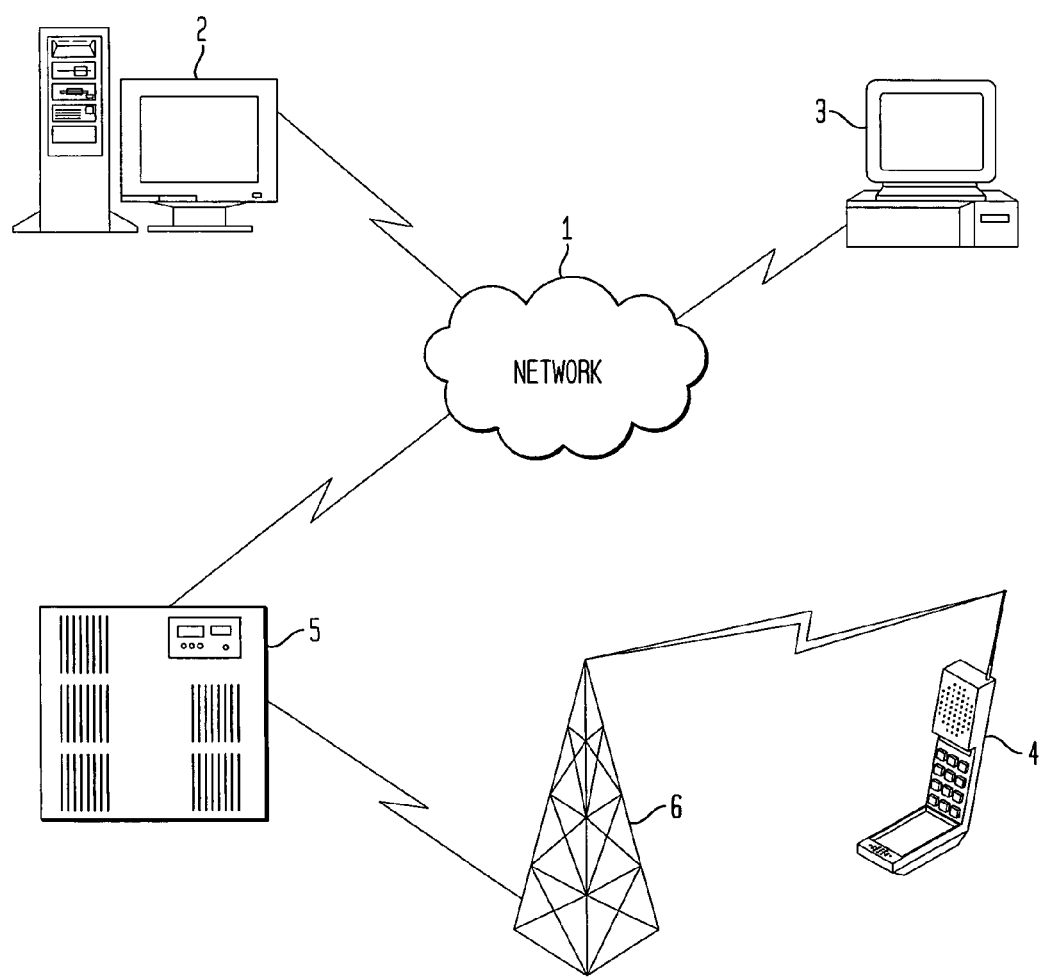
FIG. 1 is a schematic diagram showing an information distribution system according to one embodiment of the present invention.

1: Network
2: Server
3: User terminal (computer)
4: Mobile phone
5: Communication controller
6: Base station
11: User's public information file
12: Information acquisition request acceptance means
13: Information choice generation means
14: Timer
15: Attribute information file
16: Information main body request acceptance means
17: Information main body extraction means
18: Information main body file
19: Transmission/reception interface means
21: User interface
22: Secret user information file
23: Information acquisition request means
24: Timer
25: Determination means
26: Information main body request means
27: Information main body display means
28: Transmission/reception interface means

DETAILED DESCRIPTION

FIG. 1 is a schematic diagram showing an information distribution system according to the embodiment. This information distribution system includes a network 1, to which a server 2 of an information provider and a computer 3 of a user who receives information are connected. Further, a mobile phone 4, belonging to a user, is connected to the network 1 through a mobile phone communication controller 5 and a base station 6, and information is provided for the user via the computer 3 or the mobile phone 4. In this embodiment, the computer 3 and the mobile phone 4 are employed; however, a well known PDA (Personal Digital Assistant) may also be used as a terminal for the transmission of data. The Internet can be used as an example for the network 1 in FIG. 1.

The Internet, which, as is well known to one having ordinary skill in the art, is a computer network based on TCP/IP (Transmission Control Protocol/Internet Protocol) or UDP (User Datagram Protocol) communication protocols, can be employed as the network 1. In the following explanation, it is assumed that the Internet is used as the network 1. However, since the present invention does not depend on transfer protocols, the network 1 is not limited to the Internet or TCP/IP is just one. The server 2 of the information provider is a computer system belonging to a service provider who furnishes an information distribution service according to the embodiment. The computer 3 and the mobile phone 4, belong to a user, a recipient of information. The communication controller 5 is, a gateway for the connection to the Internet or the communication network of the mobile phone enterprise, which employs a protocol differing from that used for the Internet but which has a similar function. And the base station 6 is a radio station for providing a wireless connection between the mobile phone 4 and the mobile phone network.

Figure 2:
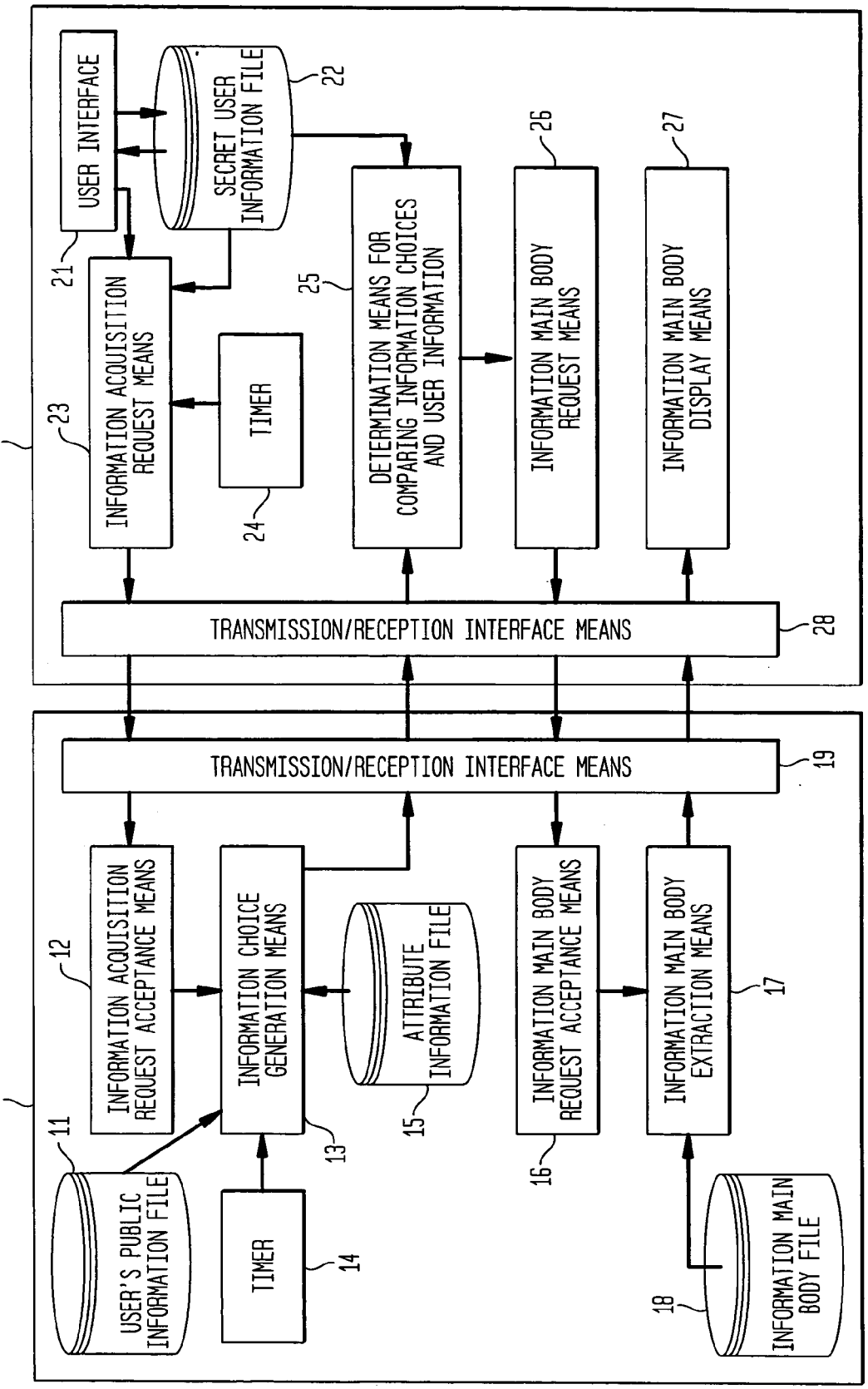
FIG. 2 is a block diagram illustrating the configurations of the server for an information provider and a user terminal (a computer or a mobile phone).

FIG. 2 is a block diagram illustrating the configurations of the server 2 of the information provider and of the computer 3 or the mobile phone 4 of the user.

The server 2 of the information provider comprises: storage means for storing a user's public information file 11; information acquisition request acceptance means 12; information choice generation means 13; a timer 14; storage means for storing an attribute information file 15; information main body request acceptance means 16; information main body extraction means 17; storage means for storing an information main body file 18; and transmission/reception interface means 19. The computer 3 or the mobile phone 4 comprises: a user interface (UI) 21; storage means, for storing a secret user information file 22; information acquisition request means 23; a timer 24; determination means 25, for comparing the information choices and user information; information main body request means 26; information main body display means 27; and transmission/reception interface means 28.

Information (first information) for which disclosure permission has been granted by a user is recorded in the user's public information file 11. The examples of this information are; rough category, for example, the field of the information the user is seeking, the desired distribution time, and the location of the user. Disclosure of the information refers not only to global disclosure, to everybody, but also disclosure only to the information provider. As will be described later, the user's public information file 11 is used by the information provider to extract, from the data that is provided, worthwhile information or digest information (first choice) for transmission to the user. This extraction process is an operation for roughly filtering the information provided by the information provider.

The information acquisition request acceptance means 12 accepts an information acquisition request from a user terminal. The information acquisition request acceptance means 12 accepts the information acquisition request from the user, analyzes the request, and shifts the process to the information choice generation means 13. When, for example, the information acquisition request from the user terminal conforms to HTTP (Hyper Text Transfer Protocol), the information acquisition request acceptance means 12 can be constituted as a CGI (Common Gateway Interface) designated using HTTP.

Upon the receipt of the request from the information acquisition request acceptance means 12, the information choice generation means 13 extracts, from all the information held by the information provider, information choices to be transmitted to the user. The extracted information choices are transmitted via the transmission/reception interface means 19 to the user terminal. The extracted information choices consist of attribute information that has been digested, and since instead of the main body of the information, only the attribute information is used, the amount of information is reduced, and accordingly, the communication load is lessened. The second filtering of the received information choices is performed by the user terminal, as will be described later. At this time, the information choices can be filtered using the attribute information, without the main body of the information being required. Therefore, the main body of the information is not required at this step; the attribute information is sufficient. In this preferred embodiment, the attribute information is employed as an information choice; however, the information choices including the main body of the information may also be generated. In this case, the process for filtering information can also be performed, even though the communication volume is increased.

The timer 14 is counting means for providing the current time, and is used for the determination and the designation of the distribution time.

The attribute information file 15 is an information file in which only the attribute of information is stored, and, as previously described, is referred to by the information choice generation means 13. The attribute information file 15 need not be recorded as a single independent file, and may be assembled as a part of the information main body file 18.

The information main body request acceptance means 16 accepts an information main body acquisition request from the user terminal, analyses the request, and shifts the process to the information main body extraction means 17. As well as the information acquisition request acceptance means 12, the information main body request acceptance means 16 can be constituted as a CGI.

The information main body extraction means 17 receives the process from the information main body request acceptance means 16, and extracts the main body of the information that matches the request. For this extraction, the information main body file 18 is referred to. The extracted main body of the information is then transmitted, via the transmission/reception interface means 19, to the user terminal.

The main body of the information is recorded in the information main body file 18. As is described above, the information main body file 18 may be assembled with the attribute information file 15. The user's public information file 11, the attribute information file 15 and the information main body file 18 need not always be stored in the system of the server 2 of the information provider. These files may be stored in another system on the network 1, so long as the storage locations are designated by address designation means such as a URL or an IP address.

The transmission/reception interface means 19 provides an interface for the transmission of data by the server 2 of the information provider, or for the reception of external data.

The user interface (UI) 21 provides an interface for the input of data by the user to the user terminal (the computer 3 or the mobile phone 4). The user interface 21 is, for example, a keyboard or a pointing device, such as a mouse.

Personal information that the user desires to keep secret is recorded in the secret user information file 22. The secret user information file 22 is stored in the user's apparatus (the computer 3 or the mobile phone 4), and is not stored in the server 2 of the information provider. The user can exercise continuous control of the secret user information file 22, and can insure that its secrecy is not compromised.

The timing for obtaining information (acquisition time information) may also be recorded in the secret user information file 22.

The information acquisition request means 23 generates an information acquisition request from the user. This request, for example, is one that is to be issued at an arbitrary timing upon user's request, or one that is to be issued at a timing that has been scheduled in advance. An acquisition request that is to be issued at an arbitrary timing is generated by using direct input received from the user via the user interface 21. Whereas an acquisition request that is to be issued at a scheduled timing is automatically generated by referring to the information schedule in the secret user information file 22 and the timer 24. In one form of the embodiment of this invention, the information acquisition request means 23 generates an HTTP request.

The timer 24 is the same as the timer 14, and as previously described, is referred to by the information acquisition request means 23.

The determination means 25, for comparing the information choice and the user information, refers to the secret user information file 22 to filter the information choices received from the server 2 of the information provider. As is described above, the information choices are, to a degree, selected using the user's public information, and are further filtered to information that is more appropriate for the user. The secret user information file 22 is employed for this filtering process, and since in the secret user information file 22 more detailed personal information is recorded for the user, the information choices can be filtered to obtain detailed information that is more appropriate for the user. As is described above, when the detailed personal information has been recorded in the secret user information file 22, information appropriate for the user can be extracted, while the secret user information file 22 is kept secret and leakage of the personal information does not occur. That is, when the system of this embodiment is employed, both the detailed filtering of information and the maintenance of the secrecy of the personal information are possible.

The information main body request means 26 requests the main body of the information selected by the determination means 25. As well as the information acquisition request means 23, this request means 26 can generate an HTTP request.

The information main body display means 27 displays the main body of the information obtained from the server 2 of the information provider. The display means 27 is a display device, for example, such as a liquid crystal panel or a CRT (Cathode Ray Tube), and the transmission/reception interface means 28 is the same as the transmission/reception interface means 19.

Figure 3:
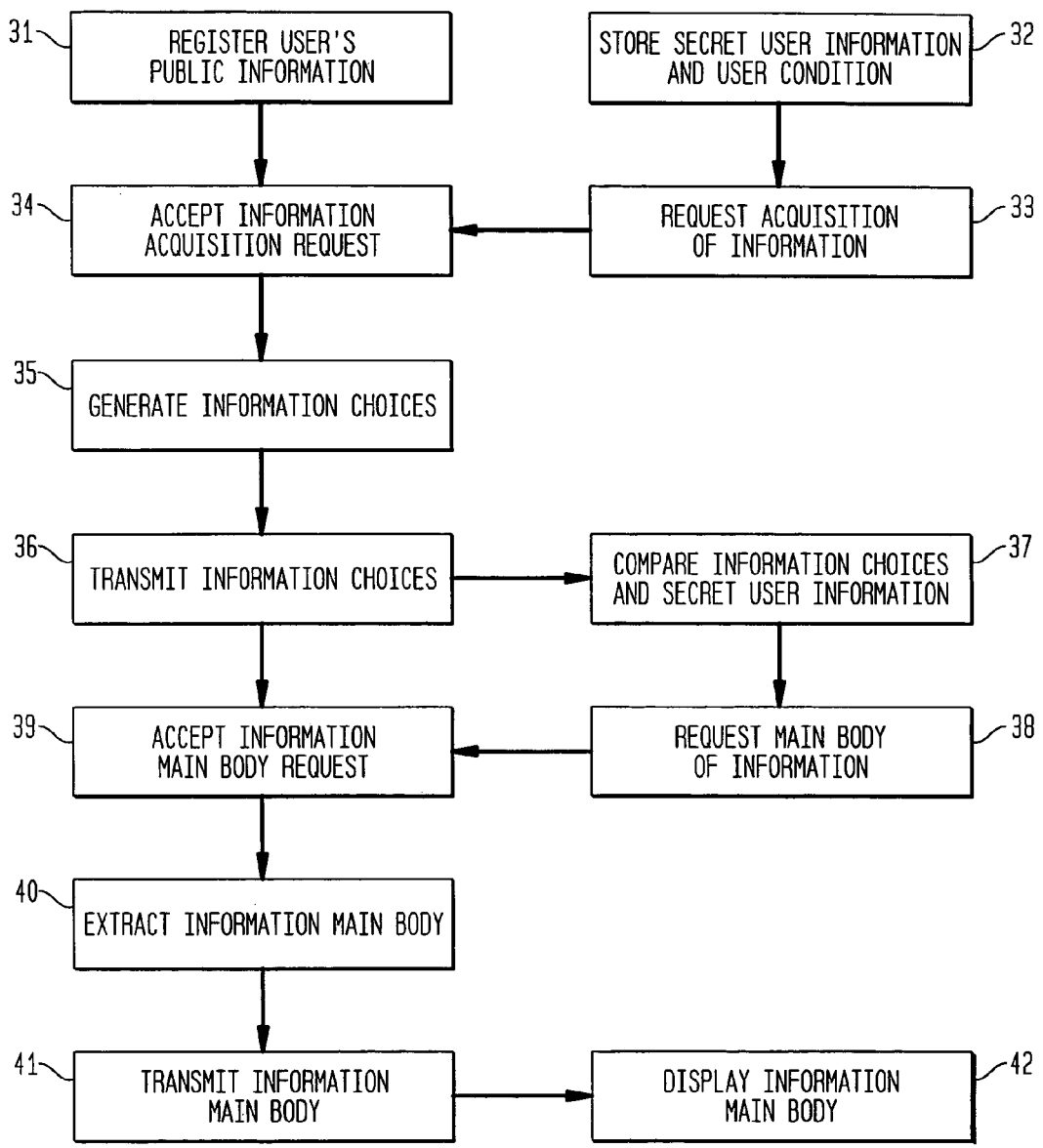
FIG. 3 is a flowchart showing an example information distribution method according to the embodiment of the invention.

An information distribution method using the above information distribution system will now be described while referring to FIG. 3. FIG. 3 is a flowchart showing the information distribution method according to the one form of the preferred embodiment. In FIG. 3, the process performed by the server 2 of the information provider is shown on the left, and the process performed by the user terminal (personal computer 3 or the mobile phone 4) is shown on the right.

First, the user's public information is registered in the server 2 of the information provider (step 31). To register the user's public information, the user terminal accesses the server 2 to display a web page and to enter required data in the input fields of the web page. It should be noted that the registration means is not limited to this process, and an off-line application, such as mailing, may be employed. In this case, required data are entered in the server 2 through an operator. The registered user's public information is recorded in the user's public information file 11.

FIG. 4 is a diagram showing an example for the registered user's public information. In this example, the field of the public information and the distribution time are registered. As is shown in FIG. 4, for the user having user ID "234", "menu" is entered in the information field, and "when requested" is entered in the distribution time. For the user having user ID "234", the information for the menu is extracted during the process for generating information choices (first filtering step), and the information choices are transmitted when the request is issued by the user. As is described above, the user's public information is used to filter the information to be distributed to the user terminal, and is not secret personal information concerning the user's privacy. The user's public information is limited to the information that the user permits to be registered. However, the data that the user permits to be registered may contain personal information that is generally considered to be very secret. In other words, the determination of which information is to be registered is entrusted to the user. In FIG. 4, the information field and the distribution time are shown, but other information, such as position information for the user, may be registered if available. The address information that indicates the distribution destination across the Internet can be recorded, while it is correlated with the user ID. The user's public information can be changed as needed by the user.

The user terminal stores secret user information and a determination condition in the secret user information file 22 (step 32). The user interface 21 is employed to enter the secret user information and the determination condition, and also to change the information and the condition. As an assumption, previously described or succeeding functions are mounted in the user terminal.

The user terminal issues an information acquisition request (step 33). For the user having user ID "234", the request operation at step 33 is required because the server 2 returns information choices only after a request has been issued. When the information choices are to be transmitted by the server 2 based on a schedule, the information acquisition request at step 33 is not required. When the position information for the user is available, however, the information acquisition request can be issued by referring to this information. For example, when a user makes an entry in a specific service area, this is detected, and the information acquisition request can be automatically issued.

The server 2 accepts the information acquisition request (step 34). As is described above, when the transmission of information choices has been scheduled in advance, program control advances to step 35 in accordance with the schedule.

The server 2 generates information choices (step 35). For the generation of information choices, the server 2 employs the user's public information to perform the first filtering process for all the information held by the server 2. FIG. 5 is a diagram showing example information choices that are thus generated. In the example in FIG. 5, the information choices are for the user having user ID "234" in FIG. 4. That is, the information choices in FIG. 5 are obtained by extracting information corresponding to the menu for all the information held by the server 2. For this extraction, "menu" is designated a keyword for attribute 1, for example, and a search for the information is conducted by using this keyword. The information choices in this example are attribute information sets. When only the attribute information is used for the information choice, the load imposed by the communication of information choices can be reduced, and the processing load imposed on the user terminal can also be reduced. Other attribute sets that are not related to the extraction at step 35 can be included in the information choices when designated by the server 2 or by the user. It should be noted that when the user designates the attribute set this may mean one type of personal information is disclosed. Therefore, in order to protect the personal information, it is preferable that an attribute set determined in advance, in accordance with the information field, be included in the information choices, so that the type of the desired attribute does not result the disclosure of the personal information. In the example in FIG. 5, "the name of a restaurant near the current location, the name of a meal and the calories/salt contained in the meal" are designated attribute information. Of course, the attribute information is not limited to this. Further, a free keyword may be designated to represent attribute information, and an entry matching the free keyword may be defined as an attribute.

Following this, the server 2 transmits the information choices to the user terminal (step 36). Since, as is described above, the data to be transmitted is attribute information, only a small amount of data is handled, so that no particular problem is encountered by a user, even when more or less useless data are included.

The user terminal receives the information choices, and compares them with the secret user information (step 37). FIG. 6 is a diagram showing example secret user information stored in the user terminal. The personal information for a user suffering from chronic angina pectoris is shown as an example. For dietary reasons, the user is limited to a caloric intake of 1800 kcal and a salt intake of 10 g a day. As is described above, the user recorded these data as personal information in the secret user information file. When the intake of the user on a specific day is "breakfast: 530 kcal and salt 2.2 g", "lunch: 660 kcal and salt 2.5 g", the total intake is "1190 kcal and salt 4.7 g", this is shown as the current state in FIG. 6. Therefore, according to the current diet for this user, for dinner, the user's intake should be 610 kcal or less and 5.3 g of salt or less. Information matching this condition is searched for among the information choices received from the server 2. FIG. 7 is a diagram showing the list of information that is determined at step 37 to match the condition. Information IDs "001" and "002" in FIG. 5 match the condition.

The user terminal issues an information acquisition request to obtain the main body of the information in FIG. 7 (step 38). Subsequently, in response to the request the information ID in FIG. 7 is provided.

Figure 8:
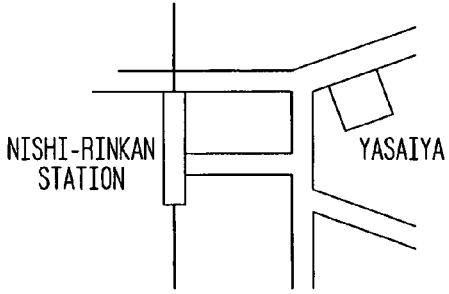
FIG. 8 is a diagram showing an example main body of information display.

The server 2 accepts the request for the main body of the information (step 39), and extracts the main body of the information from the information main body file 18 (step 40). The extracted main body of the information is then transmitted by the server 2 to the user terminal (step 40), and thereafter, the user terminal displays the received main body of the information on the screen of the display device (step 42). FIG. 8 is a diagram showing an example display of the main body of the information presented on the screen.

In this example, the main body for the information ID "001" is displayed. The detailed information for "001" is displayed along with image data (a map). In this manner, the main body of the information can include image data, and the amount of data is therefore generally large. However, according to this information distribution system and method, a main body composed of a large amount of data is distributed only when there is a large amount of truly necessary information. Therefore, an increase in the communication traffic and the processing load imposed on the information processing apparatuses can be minimized.

Figure 9:
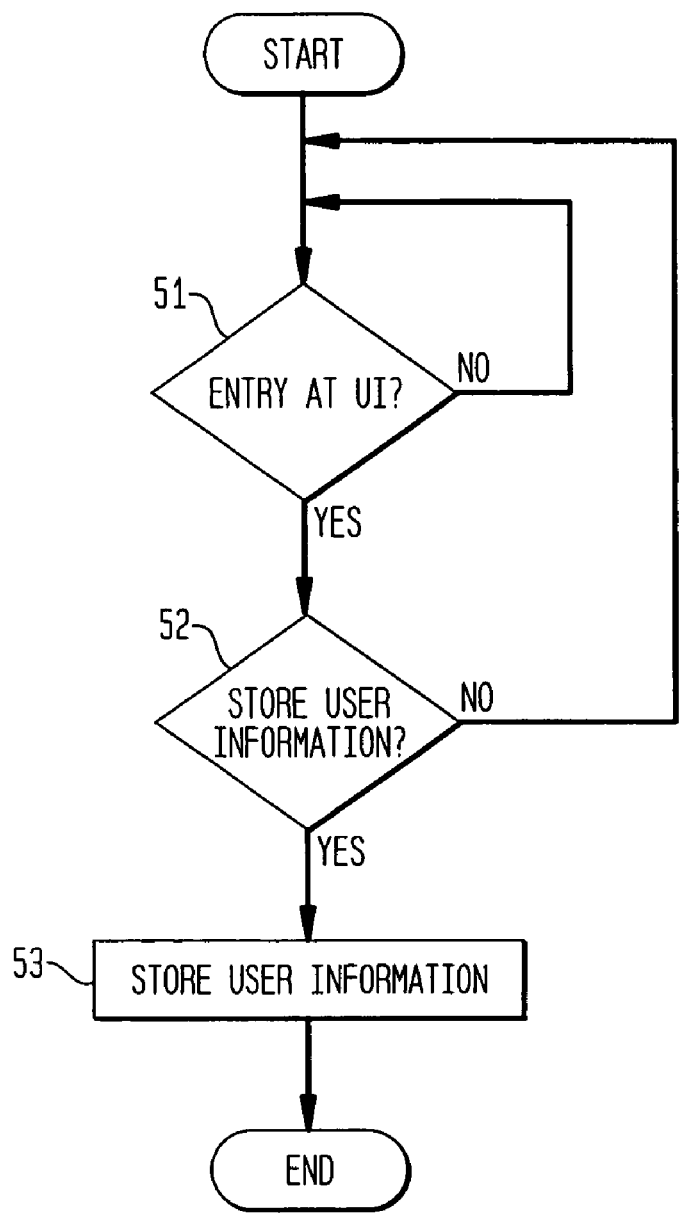
FIG. 9 is a detailed flowchart for the process at step 32 in FIG. 3.
Figure 10:
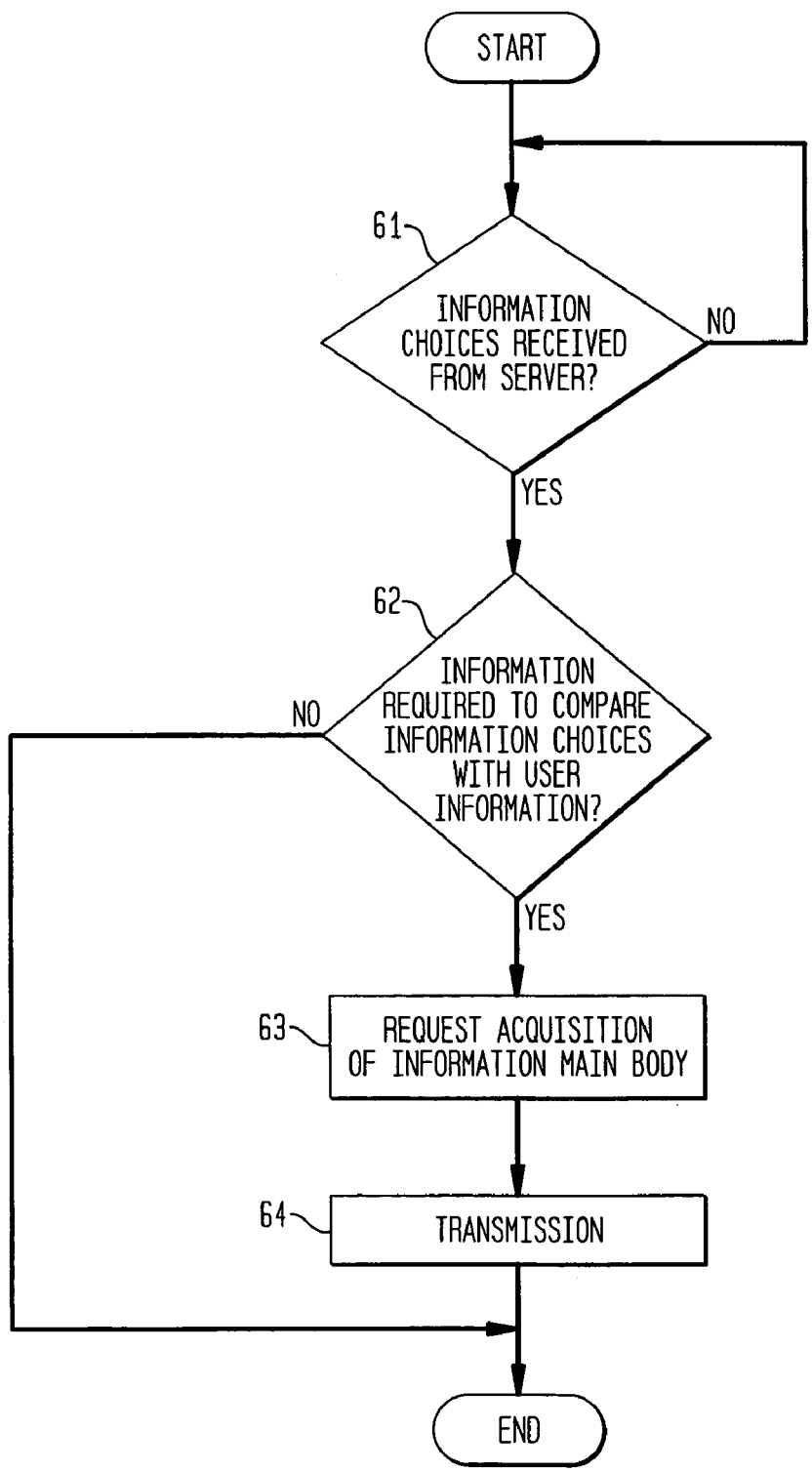
FIG. 10 is a detailed flowchart for the processes at steps 37 and 38 in FIG. 3.

FIG. 9 is a detailed flowchart showing the process at step 32 in FIG. 3. First, at step 51 a check is performed to determine whether data has been entered at the user interface 21. When no data has been entered, program control returns to step 51 and the waiting state is resumed. However, when a data entry at the user interface 21 is detected, a check is performed to determine whether the data should be stored as user information in the secret user information file 22 (step 52). When the result obtained in No, program control again returns to step 51, but if the obtained result is Yes, program control advances to step 53 and the user information is stored. FIG. 10 is a detailed flowchart showing the processes at steps 37 and 38 in FIG. 3. At step 61, a check is performed to determine whether information choices have been received from the server 2. When the result obtained is No, program control returns to step 61, and the waiting state is resumed, but if the result obtained is Yes, program control advances to step 62, and the information choices are compared with the user information. First, a check is performed to determine whether the information extracted as the result of comparison is required (step 62). If it is determined the information is required (Yes), a request is generated to obtain the main body of information (step 63), and is transmitted to the server 2 (step 64). But when it is ascertained at step 62 that the extracted information is not required (No), the processing is terminated.

As is described above, according to the information distribution system and method of this embodiment, optimal information can be obtained based on detailed personal information, without the personal information being disclosed, i.e., without the personal information being registered in the server 2. Further, since the information choices that are first transmitted by the server 2 to the user terminal are selected in accordance with results obtained by a rough categorization process, information the user may find useless may be included in the information choices. However, in this case since attribute information is transmitted instead of the main body, the communication load and the processing load imposed on the information processing apparatuses can be reduced. In addition, since the detailed main body of information that is finally transmitted, as truly required information, to the user is selected by filtering the available data, the user can obtain detailed information, while the communication load and the processing load are minimized.

The present invention has been specifically explained in accordance with the embodiment. However, the present invention is not limited to this embodiment, and can be variously modified without departing from the scope of the invention.

In this embodiment, the user terminal automatically filters information choices based on secret user information. According to the user's desires, a list of information choices may simply be provided for the user, and the user may then select information from the list.

For a user who believes that personal information is important, various items of information may be distributed to the user terminal, without the user's public information being used, at random timing.

Further, a learning function can be provided for the user terminal. The program can be so designed, for example, that information choices transmitted by the server 2 may be provided as a list on which the contents of a display request and a rejection request received from the user are recorded, so that data matching the tastes of the user are displayed first. Or the program may be so designed that labels are provided for attributes and the frequency at which specific labels are selected by a user recorded, so that attribute labels having high selection frequencies can be displayed first.

When the user terminal for which this embodiment is applied is a mobile phone, attribute information can be transmitted using the control channel for the mobile phone. The control channel is the communication which takes place intermittently to obtain base station for the mobile phone. When the attribute information in this embodiment is transmitted using the free space of the communication channel, part of the information can be distributed without an increase in traffic. In this case, the communication channel is opened and used for the transmission and reception of the main body of the information.

Of course, a PDA can be used as the user terminal for this embodiment.

As will be understood, according to the invention, while maintaining the secrecy of personal information, it is possible to provide means for selecting truly necessary information from among an enormous amount of data and to distribute the selected information. Further, it is possible to provide means for appropriately selecting required information without personal information having to be disclosed.

While the present invention has been described with reference to preferred embodiments thereof, numerous obvious changes and variations may readily be made by persons skilled in the information field. Accordingly, the invention should be understood to include all such variations to the full extent embraced by the claims.

What is claimed is:

1. An information distribution method, for a network system including a first information processing apparatus for providing information, a second information processing apparatus for obtaining said information, and a network for connecting said first and said second information processing apparatuses, comprising the steps of:

said first information processing apparatus recording first information for a user;

said second information processing apparatus recording second information for said user;

said first information processing apparatus, while referring to said first information, generating a single first choice or multiple first choices concerning said information;

said second information processing apparatus receiving said first single or multiple choices from said first information processing apparatus via said network;

said second information processing apparatus, while referring to said second information, selecting as a single second choice said single first choice or selecting multiple second choices from among said multiple first choices concerning said information;

said second information processing apparatus requesting that said first information processing apparatus obtain part or all of said information correlated with said single second choice or said multiple second choices;

said first information processing apparatus transmitting said requested information to said second information processing apparatus, and said second information processing apparatus receiving said requested information; and said second information processing apparatus displaying said received information;

wherein said first information is information concerning said user that can be disclosed, and said second information is secret information held by said user.

2. The information distribution method according to claim 1, wherein said first single choice or said first multiple choices and said second single choice or said second multiple choices are attribute information for said information.

3. An information distribution method comprising the steps of:

recording first information concerning a user;

referring to said first information to generate a first single choice or first multiple choices concerning information to be provided;

transmitting said first single choice or said first multiple choices across a network to a second information processing apparatus; and transmitting to said second information processing apparatus, in response to a request, part or all of information concerning said first single choice selected as a second single choice or said first multiple choices selected as multiple second choices;

wherein said first information is information concerning said user that can be disclosed, and wherein selection of said second single choice or said second multiple choices is based on reference to second information, said second information being secret information held by said user.

4. An information distribution method comprising the steps of:

recording second information concerning a user;

receiving a first single choice or first multiple choices across a network concerning information generated by a first information processing apparatus, said first single choice or said first multiple choices being generated based on reference to first information concerning the user;

referring to said second information to select as a second single choice said first single choice or to select as second multiple choices said first multiple choices concerning said information;

requesting part or all of said information correlated with said second single choice or said second multiple choices;

receiving said information from said first information processing apparatus; and displaying said received information;

wherein said first information is information concerning said user that can be disclosed, and said second information is secret information held by said user.

5. An information distribution system, including a first information processing apparatus for providing information, a second information processing apparatus for obtaining said information, and a network for connecting said first and said second information processing apparatuses, comprising:

means for recording first information for a user in said first information processing apparatus;

means for recording second information for said user in said second information processing apparatus;

means for permitting said first information processing apparatus to, while referring to said first information, generate a single first choice or multiple first choices concerning said information;

means for permitting said second information processing apparatus to receive said first single or multiple choices from said first information processing apparatus via said network;

means for permitting said second information processing apparatus to, while referring to said second information, select as a single second choice said single first choice or selecting multiple second choices from among said multiple first choices concerning said information;

means for permitting said second information processing apparatus to request that said first information processing apparatus obtain part or all of said information correlated with said single second choice or said multiple second choices;

means for permitting said first information processing apparatus to transmit said requested information to said second information processing apparatus, and for permitting said second information processing apparatus to receive said requested information; and means for permitting said second information processing apparatus to display said received information;

wherein said first information is information concerning said user that can be disclosed, and said second information is secret information held by said user.

6. The information distribution system according to claim 5, wherein said first single choice or said first multiple choices and said second single choice or said second multiple choices are attribute information for said information.

7. An information processing apparatus comprising:

means for recording first information concerning a user;

means for referring to said first information to generate a first single choice or first multiple choices concerning information to be provided;

means for transmitting said first single choice or said first multiple choices across a network to a second information processing apparatus; and means for transmitting to said second information processing apparatus, in response to a request, part or all of information concerning said first single choice selected as a second single choice or said first multiple choices selected as multiple second choices;

wherein said first information is information concerning said user that can be disclosed, and wherein selection of said second single choice or said second multiple choices is based on reference to second information, said second information being secret information held by said user.

8. An information processing apparatus comprising:

means for recording second information concerning a user;

means for receiving a first single choice or first multiple choices across a network concerning information generated by a first information processing a apparatus, said first single choice or said first multiple choices being generated based on reference to first information concerning the user;

means for referring to said second information to select as a second single choice said first single choice or to select as second multiple choices said first multiple choices concerning said information;

means for requesting part or all of said information correlated with said second single choice or said second multiple choices;

means for receiving said information from said first information processing apparatus; and means for displaying said received information;

wherein said first information is information concerning said user that can be disclosed, and said second information is secret information held by said user.

9. A computer readable medium containing one or more programs which permits a computer to perform the following steps:

recording first information concerning a user;

referring to said first information to generate a first single choice or first multiple choices concerning information to be provided;

transmitting said first single choice or said first multiple choices across a network to a second information processing apparatus; and transmitting to said second information processing apparatus, in response to a request, part or all of information concerning said first single choice selected as a second single choice or said first multiple choices selected as multiple second choices;

wherein said first information is information concerning said user that can be disclosed, and wherein selection of said second single choice or said second multiple choices is based on reference to second information, said second information being secret information held by said user.

10. A computer readable medium containing one or more programs which permits a computer to perform the following steps:

recording second information concerning a user;

receiving a first single choice or first multiple choices across a network concerning information generated by a first information processing apparatus, said first single choice or said first multiple choices being generated based on reference to first information concerning the user;

referring to said second information to select as a second single choice said first single choice or to select as second multiple choices said first multiple choices concerning said information;

requesting part or all of said information correlated with said second single choice or said second multiple choices;

receiving said information from said first information processing apparatus; and displaying said received information;

wherein said first information is information concerning said user that can be disclosed, and said second information is secret information held by said user.

* * * * *